(12) United States Patent
Leon

(10) Patent No.: US 10,252,760 B1
(45) Date of Patent: Apr. 9, 2019

(54) BICYCLE SEAT SUSPENSION SYSTEMS

(71) Applicant: Martin G. Leon, Phoenix, AZ (US)

(72) Inventor: Martin G. Leon, Phoenix, AZ (US)

( * ) Notice: Subject to any disclaimer, the term of this patent is extended or adjusted under 35 U.S.C. 154(b) by 22 days.

(21) Appl. No.: 15/458,885

(22) Filed: Mar. 14, 2017

Related U.S. Application Data

(60) Provisional application No. 62/389,998, filed on Mar. 14, 2016.

(51) Int. Cl.
  *B62J 1/04* (2006.01)
  *B62J 1/06* (2006.01)

(52) U.S. Cl.
  CPC .. *B62J 1/04* (2013.01); *B62J 1/06* (2013.01)

(58) Field of Classification Search
  CPC ............... B62J 1/02; B62J 1/04; B62J 1/06
  See application file for complete search history.

(56) References Cited

U.S. PATENT DOCUMENTS

| | | | |
|---|---|---|---|
| 5,240,268 A * | 8/1993 | Allsop | B62J 1/04 280/220 |
| 5,308,030 A * | 5/1994 | Bales | B62K 19/36 248/214 |
| 5,611,557 A * | 3/1997 | Farris | B62K 3/04 280/275 |
| D381,941 S * | 8/1997 | Chan | D12/111 |
| D385,229 S * | 10/1997 | Chan | D12/111 |
| 5,725,227 A * | 3/1998 | Mayer | B62K 25/30 280/275 |
| 6,050,584 A * | 4/2000 | Sibson | B62J 1/28 280/283 |
| 6,073,949 A * | 6/2000 | O'Hare | B62J 1/04 267/132 |
| 6,113,057 A | 9/2000 | Cheng | |
| 6,139,039 A * | 10/2000 | Becker | B62J 1/04 280/275 |
| 6,409,130 B1 | 6/2002 | Maret | |
| 8,777,250 B1 | 6/2014 | Yu | |
| 8,857,841 B2 | 10/2014 | Lund et al. | |
| 8,888,117 B2 | 11/2014 | Barkley et al. | |
| 9,004,518 B2 | 4/2015 | Yu | |
| 9,242,693 B2 | 1/2016 | Voss | |
| 9,272,745 B2 | 3/2016 | Camp et al. | |
| 2009/0267316 A1 | 10/2009 | Gonzalez et al. | |
| 2012/0027510 A1 | 2/2012 | Chen | |

FOREIGN PATENT DOCUMENTS

WO 2014/145085 A2 9/2014

* cited by examiner

*Primary Examiner* — Kevin Hurley
(74) *Attorney, Agent, or Firm* — Lodestar Patents, PLLC; Raymond J E. Hall

(57) ABSTRACT

A bicycle seat suspension system using a suspension arm mounted on the frame of a bicycle attached to the seat-post of the seat having two shock absorbers absorbing differing amounts of shock by virtue of a multiplier arm.

16 Claims, 4 Drawing Sheets

BICYCLE SEAT SUSPENSION SYSTEMS

CROSS-REFERENCE TO RELATED APPLICATION

The present application is related to and claims priority from prior provisional application Ser. No. 62/389,998, filed Mar. 14, 2016, entitled "BICYCLE SEAT SUSPENSION SYSTEMS"; the contents of which are incorporated herein by this reference and are not admitted to be prior art with respect to the present invention by the mention in this cross-reference section.

BACKGROUND

This invention relates to providing a system for improved Bicycle seat suspension systems. More particularly this invention relates to providing a system for absorbing shock applied to a seat of a bicycle. Bicycling is one of the greatest exercises available and can be enjoyable to get out and about rather than exercises done inside a stuffy room. Additionally, many individuals find the bicycle a viable and inexpensive form of travel. However, for many, the seat of a bicycle can be very uncomfortable, particularly when riding on uneven surfaces and when changing direction of travel abruptly. Often the solutions presented by the industry are half solutions at best and only give the illusion of comfort until the individual actually goes for a semi-lengthy ride (outside of a relatively smooth parking lot). Therefore, many otherwise willing bicyclists forgo the use of bicycles.

OBJECTS AND FEATURES OF THE INVENTION

A primary object and feature of the present invention is to provide a system overcoming the above-mentioned problem.

It is a further object and feature of the present invention to provide such a system with shock absorption on a seat.

It is another object and feature of the present invention to provide such a system with dual shock absorbers.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a suspension system, relating to absorbing shock transmitted to a seat of a bicycle, comprising: at least one seat suspension comprising at least one seat post engager structured and arranged to engage at least one seat post of the seat of the bicycle, at least one frame mount structured and arranged to mount such at least one seat suspension to a frame of the bicycle, at least one suspension arm structured and arranged to couple such at least one seat post engager and such at least one frame mount, at least one rotational joint structured and arranged to permit rotation of such at least one suspension arm, at least one first suspension shock structured and arranged to directly cushion rotation of such at least one suspension arm, at least one second suspension shock structured and arranged to indirectly cushion rotation of such at least one suspension arm; wherein such at least one frame mount mounts such at least one rotational joint to such frame of the bicycle; wherein the shock transmitted from such frame of the bicycle to the seat is cushioned by such at least one seat suspension.

Moreover, it provides such a suspension system further comprising at least one motion multiplier structured and arranged to multiply the motion applied to such at least one second suspension shock in relation to the motion applied to such at least one first suspension shock. Additionally, it provides such a suspension system wherein such at least one first suspension shock connects to such at least one suspension arm and a top tube of such frame of the bicycle. Also, it provides such a suspension system wherein such at least one second suspension shock couples with such at least one rotational joint and connects to a bottom tube of such frame of the bicycle.

In addition, it provides such a suspension system wherein such at least one second suspension shock connects to such at least one motion multiplier. And, it provides such a suspension system wherein such at least one motion multiplier multiplies the motion applied to such at least one second suspension shock in relation to the motion applied to such at least one first suspension shock by a factor of two. Further, it provides such a suspension system wherein such at least one first suspension shock connects to such at least one suspension arm and a top tube of such frame of the bicycle. Even further, it provides such a suspension system wherein such at least one second suspension shock couples with such at least one rotational joint and connects to a bottom tube of such frame of the bicycle.

In accordance with another preferred embodiment hereof, this invention provides a suspension system, relating to absorbing shock transmitted to a seat of a bicycle, comprising: at least one seat suspension comprising seat post engager means for engaging at least one seat post of the seat of the bicycle, frame mount means for mounting such at least one seat suspension to a frame of the bicycle, suspension coupler means for coupling such seat post engager means and such frame mount means, rotator means for permitting rotation of such suspension coupler means, first suspension cushion means for directly cushioning rotation of such suspension coupler means, second suspension cushion means for indirectly cushioning rotation of such suspension coupler means; wherein such frame mount means mounts such rotator means to such frame of the bicycle; wherein the shock transmitted from such frame of the bicycle to the seat is cushioned by such at least one seat suspension.

Moreover, it provides such a suspension system further comprising motion multiplier means for multiplying the motion applied to such second suspension cushion means in relation to the motion applied to such first suspension cushion means. Additionally, it provides such a suspension system wherein such first suspension cushion means connects to such suspension coupler means and a top tube of such frame of the bicycle. Also, it provides such a suspension system wherein such second suspension cushion means couples with such rotator means and connects to a bottom tube of such frame of the bicycle.

In addition, it provides such a suspension system wherein such second suspension cushion means connects to such motion multiplier means. And, it provides such a suspension system wherein such motion multiplier means multiplies the motion applied to such second suspension cushion means in relation to the motion applied to such first suspension cushion means by a factor of two. Further, it provides such a suspension system wherein such first suspension cushion means connects to such suspension coupler and a top tube of such frame of the bicycle. Even further, it provides such a suspension system wherein such second suspension cushion means couples with such rotator means and connects to a bottom tube of such frame of the bicycle. Even further, it provides such a suspension system wherein such suspension coupler means comprises at least one suspension arm.

In accordance with another preferred embodiment hereof, this invention provides a suspension system, relating to absorbing shock transmitted to a seat of a bicycle, comprising: a seat suspension comprising a seat post mount, a frame mount, a suspension arm, a top bracket, a first suspension shock, a second suspension shock, a multiplier arm; wherein such frame mount mounts such top bracket to such frame of the bicycle; wherein such suspension arm connects such top bracket to such seat post mount; wherein such first suspension shock connects between such suspension arm and a top tube of a frame of the bicycle; wherein such multiplier arm connects such top bracket and such second suspension shock; wherein such top bracket permits rotation of such suspension arm and such multiplier arm; wherein such rotation of such suspension arm and such multiplier arm correspond; wherein such second suspension shock connects between such multiplier arm and a bottom tube of the frame of the bicycle; wherein a force acting vertically on the seat of the bicycle rotates such suspension arm and such multiplier arm which transfers motion to such first suspension shock and such second suspension shock; wherein the seat is cushioned from the effects of the force.

Even further, it provides such a suspension system wherein such multiplier arm multiplies the motion applied to such second suspension shock in relation to the motion applied to such first suspension shock by at least a factor of two. Even further, it provides such a suspension system wherein such multiplier arm multiplies the motion applied to such second suspension shock in relation to the motion applied to such first suspension shock by a factor of two. And this application provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
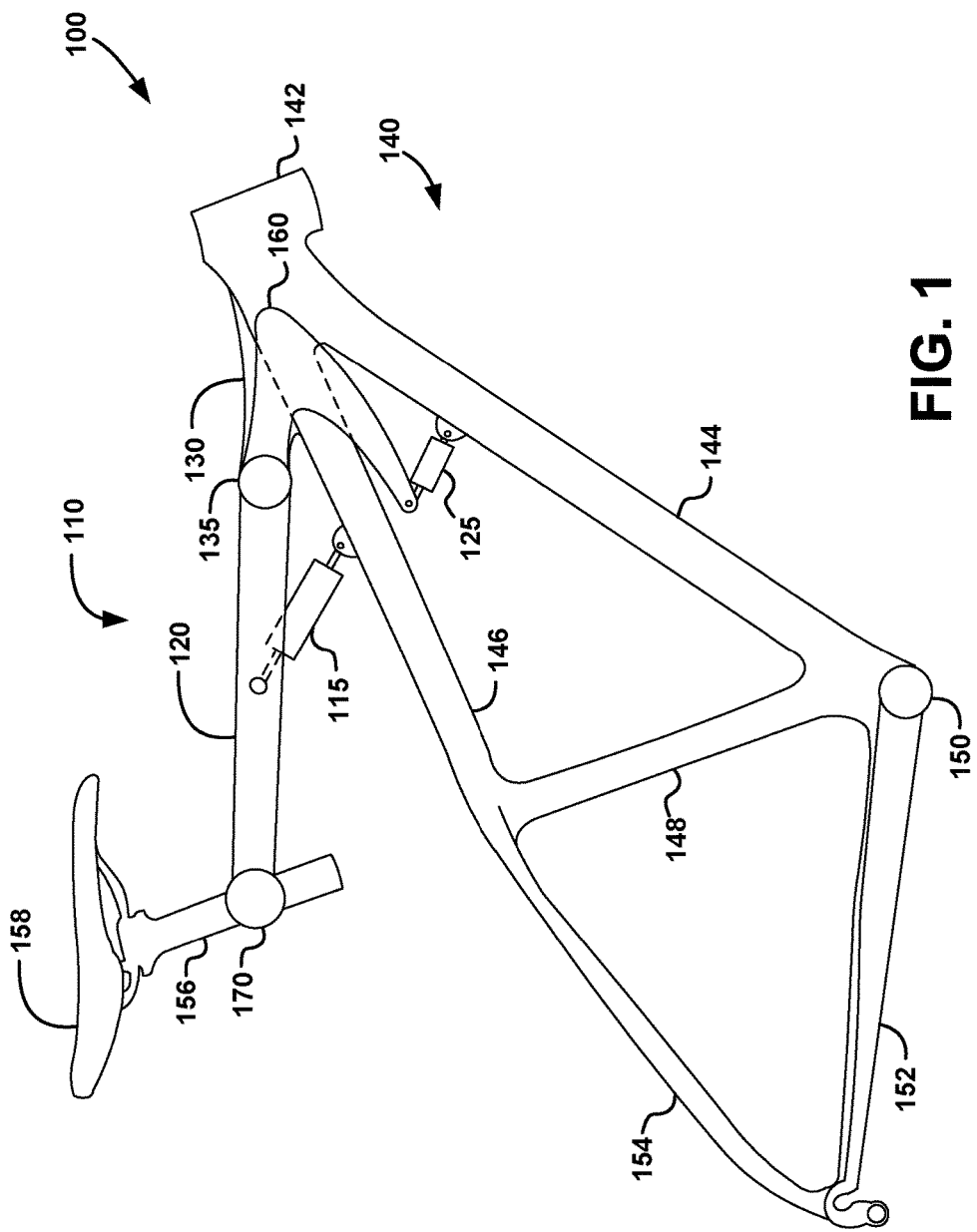
FIG. 1 shows a side view illustrating a bicycle seat suspension system according to a preferred embodiment of the present invention.

FIG. 1 shows a side view illustrating a bicycle seat suspension system 100 according to a preferred embodiment of the present invention. Bicycle seat suspension system 100 preferably comprises a bicycle frame 140 and at least one seat suspension 110, as shown. Bicycle frame 140 preferably comprises at least one top tube 146, at least one bottom tube 144, at least one chain stay 152 at least one seat stay 154, at least one seat tube 148, at least one bottom bracket shell 150, and at least one head tube 142, as shown. Seat suspension 110 preferably comprises at least one suspension mount 130, at least one top bracket 135, at least one suspension arm 120, at least one seat mount 170, at least one motion multiplier 160, at least one primary suspension shock 125, and at least one secondary suspension shock 115, as shown. A bicycle seat 158 preferably mounts to seat mount 170 by insertion of a seat post into seat mount 170 (see also FIG. 3) (at least embodying herein at least one seat post engager structured and arranged to engage at least one seat post of the seat of the bicycle; and at least embodying herein seat post engager means for engaging at least one seat post of the seat of the bicycle; and at least embodying herein a seat post mount).

Seat suspension 110 (at least embodying herein at least one seat suspension) preferably mounts to bicycle frame 140 using suspension mount 130, as shown (at least embodying herein at least one frame mount structured and arranged to mount said at least one seat suspension to a frame of the bicycle; and at least embodying herein frame mount means for mounting said at least one seat suspension to a frame of the bicycle). Suspension mount 130 preferably attaches to top tube 146, as shown. Suspension mount 130 preferably attaches top bracket 135 to top tube 146, as shown. Upon reading the teachings of this specification, those with ordinary skill in the art will now appreciate that, under appropriate circumstances, considering such issues as available bicycle frames, future technology, cost, etc., other suspension mount locations, such as, for example, to the seat tube, on the head tube, to the bottom tube, etc., may suffice.

Suspension arm 120 preferably attaches to top bracket 135 and seat mount 170, as shown. Secondary suspension shock 115 (at least embodying herein at least one first suspension shock structured and arranged to directly cushion rotation of said at least one suspension arm; and at least embodying herein first suspension cushion means for directly cushioning rotation of said suspension coupler means) preferably attaches to suspension arm 120 and top tube 146, as shown. Motion multiplier 160 preferably attaches to top bracket 135, as shown. Primary suspension shock 125 (at least embodying herein second suspension cushion means for indirectly cushioning rotation of said suspension coupler means; and at least embodying herein at least one second suspension shock structured and arranged to indirectly cushion rotation of said at least one suspension arm) preferably attaches to motion multiplier 160 and bottom tube 144, as shown. Motion multiplier 160 preferably comprises at least one multiplier arm, as shown. Upon reading the teachings of this specification, those with ordinary skill in the art will now appreciate that, under appropriate circumstances, considering such issues as available bicycle frames, cost, future technologies, etc., other motion multipliers, such as, for example, planetary gears, linkages, rods, etc., may suffice.

Figure 2:
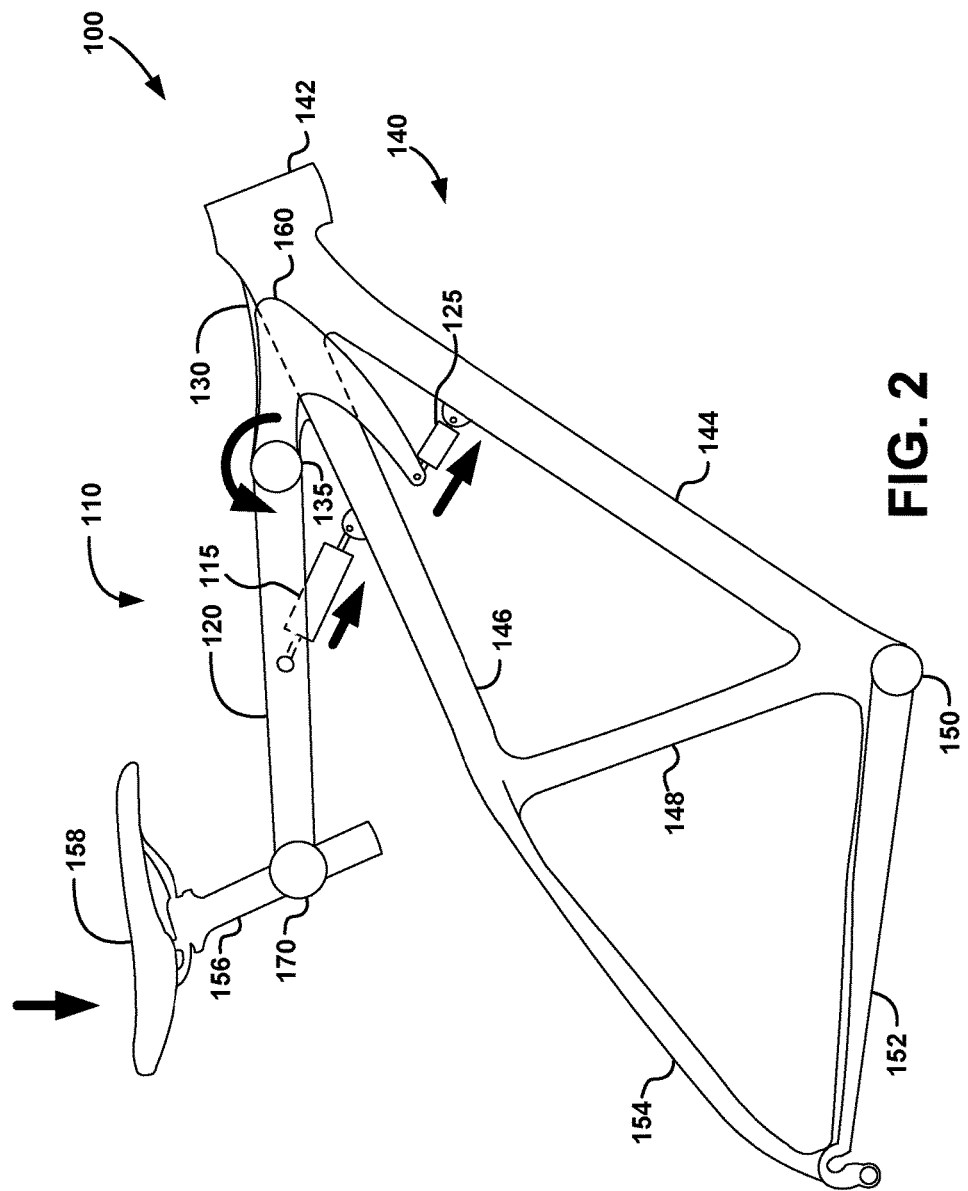
FIG. 2 shows a side view illustrating motion of the bicycle seat suspension system according to the preferred embodiment of FIG. 1.

FIG. 2 shows a side view illustrating motion of the bicycle seat suspension system according to the preferred embodiment of FIG. 1. When seat suspension 110 is active, movement of seat 158 downward preferably applies a rotation to suspension arm 120 preferably pivoting on top bracket 135, as shown. The rotary motion of suspension arm 120 preferably transfers to motion multiplier 160 (at least embodying herein at least one motion multiplier structured and arranged to multiply the motion applied to said at least one second suspension shock in relation to the motion applied to said at least one first suspension shock; and at least embodying herein motion multiplier means for multiplying the motion applied to said second suspension cushion means in relation to the motion applied to said first suspension cushion means) preferably through top bracket 135, as shown (at least embodying herein at least one rotational joint structured and arranged to permit rotation of said at least one suspension arm; and at least embodying herein rotator means for permitting rotation of said suspension coupler means). Suspension arm 120 preferably compresses secondary suspension shock 115 and motion multiplier 160 preferably compresses primary suspension shock 125, as shown. Primary suspension shock 125 preferably absorbs at least twice as much motion as secondary suspension shock 115, as shown, preferably twice as much. Preferably, primary suspension shock 125 compresses at least twice as far as secondary suspension shock 115, as shown, preferably twice as far (at least embodying herein wherein said multiplier arm multiplies the motion applied to said second suspension shock in relation to the motion applied to said first suspension shock by at least a factor of two; and at least embodying herein wherein said motion multiplier means multiplies the motion applied to said second suspension cushion means in relation to the motion applied to said first suspension cushion means by a factor of two). Upon reading the teachings of this specification, those with ordinary skill in the art will now appreciate that, under appropriate circumstances, considering such issues as available frame spacing, cost, available materials, etc., other suspension shock arrangements, such as, for example, 3:1 ratios, reversal of primary and secondary shocks, shocks incorporated into the top bracket, expansion shocks, etc., may suffice.

Primary suspension shock 125 and secondary suspension shock 115 preferably comprise pneumatic shocks, alternately preferably spring shocks. Upon reading the teachings of this specification, those with ordinary skill in the art will now appreciate that, under appropriate circumstances, considering such issues as cost, available materials, etc., other suspension shocks, such as, for example, hydraulic shocks, foam shocks, inertial shocks, etc., may suffice.

Figure 3:
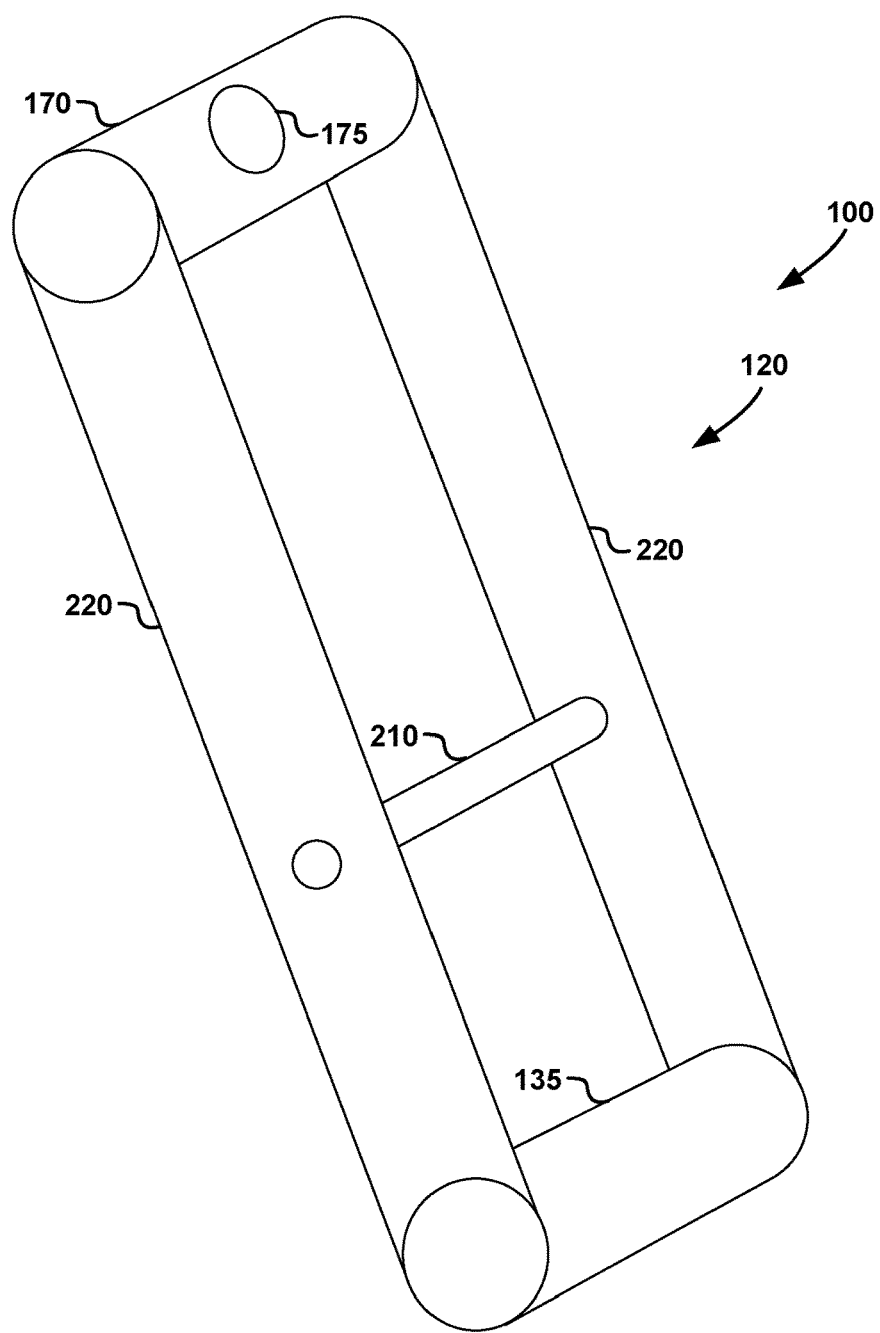
FIG. 3 shows a perspective view, illustrating a seat-suspension arm, according to the preferred embodiment of FIG. 2.

FIG. 3 shows a perspective view, illustrating a seat-suspension arm 120, according to the preferred embodiment of FIG. 2.

Suspension arm 120 preferably comprises at least one suspension stay 220, preferably two suspension stays 220, as shown. Suspension stays 220 preferably bridge between seat mount 170 and top bracket 135, as shown. Seat mount 170 preferably comprises at least one seat post hole 175 structured and arranged to permit seat post insertion through seat mount 170, as shown. Seat mount 170 preferably adjustably rotates between suspension stays 220, preferably permitting adjustment of the angle of seat post 156. Seat mount 170 and suspension stays preferably couple using Hirth couplers, permitting adjustment in rotation. Upon reading the teachings of this specification, those with ordinary skill in the art will now appreciate that, under appropriate circumstances, considering such issues as cost, available materials, future technologies, etc., other couplers, such as, for example, Curvic couplers, geared couplers, ball-socket couplers, friction couplers, etc., may suffice.

Suspension arm 120 (at least embodying herein at least one suspension arm structured and arranged to couple said at least one seat post engager and said at least one frame mount; and at least embodying herein suspension coupler means for coupling said seat post engager means and said frame mount means) further comprises at least one shock mount 210, as shown. Shock mount 210 preferably connects to suspension stays 220 between seat mount 170 and top bracket 135, as shown. Shock mount 210 preferably connects suspension arm 120 with secondary suspension shock 115 (See FIG. 1).

Figure 4:
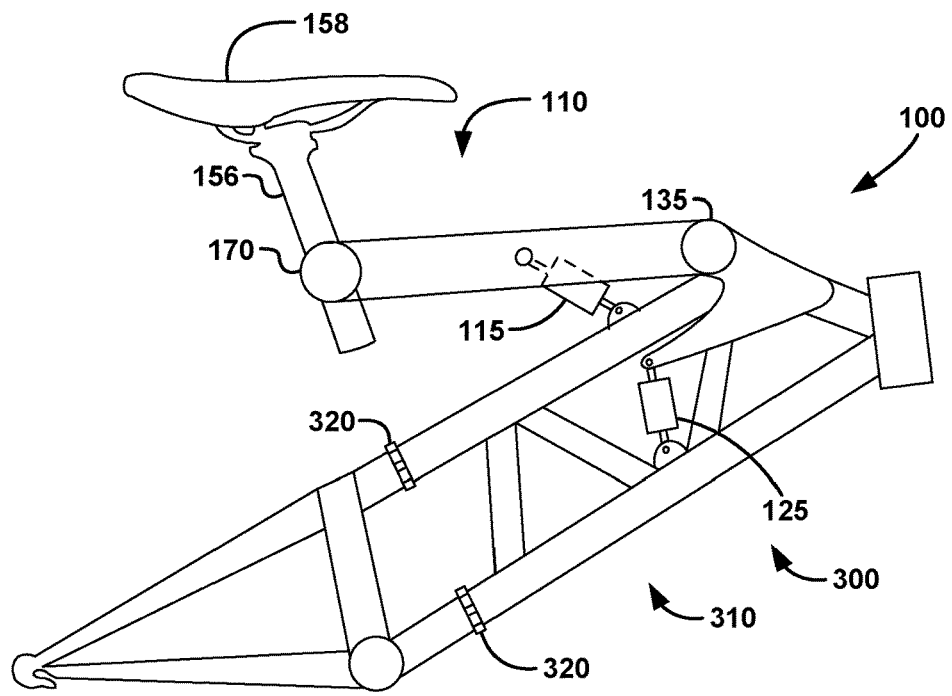
FIG. 4 shows a side view illustrating a bicycle seat suspension system adapted to another bicycle frame according to the preferred embodiment of FIG. 3.
Figure 5:
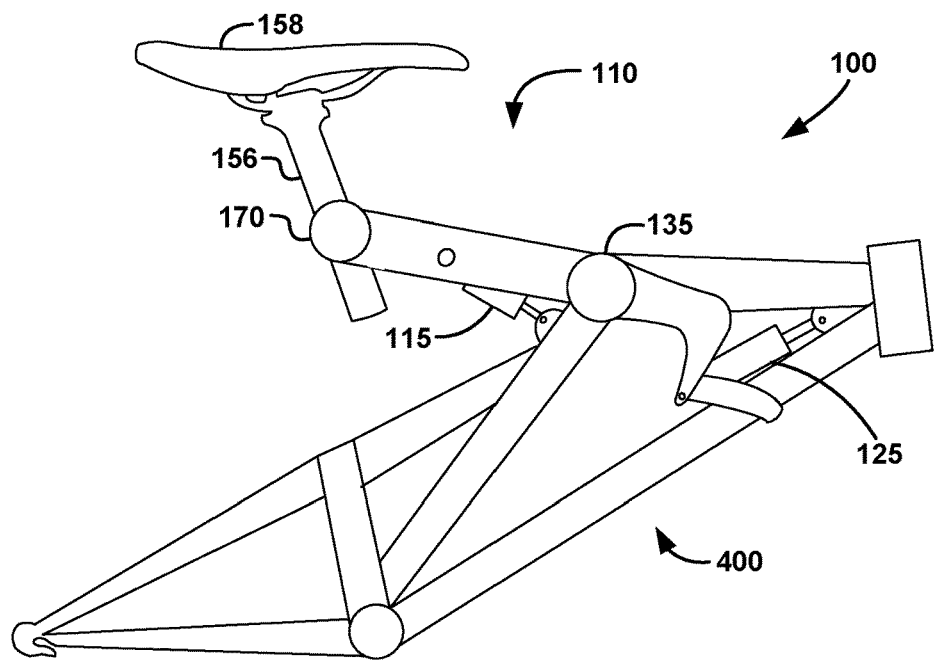
FIG. 5 shows a side view illustrating a bicycle seat suspension system adapted to yet another bicycle frame according to the preferred embodiment of FIG. 3.

FIG. 4 shows a side view illustrating a bicycle seat suspension system 100 adapted to another bicycle frame 300 according to the preferred embodiment of FIG. 3. FIG. 5 shows a side view illustrating a bicycle seat suspension system 100 adapted to yet another bicycle frame 400 according to the preferred embodiment of FIG. 3. The applicant recognizes that bicycle seat suspension system 100 is preferably adaptable to a variety of bicycle frame types, as shown. Such adaptations may require the adjustment of sizes, placement, geometries, and types of various components of bicycle seat suspension system 100. For example, frame 300 comprises a ladder frame design 310 and includes hinges 320 for folding the bicycle frame, as shown. Thus with frame 300, adjustments of mounting positions of the shocks (115 and 125) and top bracket 135 are made, as well as, adjustments to the geometry of the motion multiplier, as shown. Likewise in frame 400, shortening of the suspension arm, changes in geometry of the motion multiplier and changes in mount positions of the suspension shock are necessary to accommodate the particular geometry to frame 400, as shown. The applicant recognizes such adjustments as within the skill of one in the art once they are apprised of Applicants invention as a whole.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A suspension system, relating to absorbing shock transmitted to a seat of a bicycle, comprising:
   a) at least one seat suspension comprising
      i) at least one seat post engager structured and arranged to engage at least one seat post of the seat of the bicycle,
      ii) at least one frame mount structured and arranged to mount said at least one seat suspension to a frame of the bicycle,
      iii) at least one suspension arm structured and arranged to couple said at least one seat post engager and said at least one frame mount,
      iv) at least one rotational joint structured and arranged to permit rotation of said at least one suspension arm,
      v) at least one first suspension shock structured and arranged to directly cushion rotation of said at least one suspension arm,
      vi) at least one second suspension shock structured and arranged to indirectly cushion rotation of said at least one suspension arm;
   b) wherein said at least one frame mount mounts said at least one rotational joint to such frame of the bicycle;
   c) wherein the shock transmitted from such frame of the bicycle to the seat is cushioned by said at least one seat suspension; and
   d) wherein said at least one first suspension shock connects to said at least one suspension arm and a top tube of such frame of the bicycle.

2. The suspension system according to claim 1 further comprising at least one motion multiplier structured and arranged to multiply the motion applied to said at least one second suspension shock in relation to the motion applied to said at least one first suspension shock.

3. The suspension system according to claim 2 wherein said at least one second suspension shock couples with said at least one rotational joint and connects to a bottom tube of such frame of the bicycle.

4. The suspension system according to claim 3 wherein said at least one second suspension shock connects to said at least one motion multiplier.

5. The suspension system according to claim 2 wherein said at least one motion multiplier multiplies the motion applied to said at least one second suspension shock in relation to the motion applied to said at least one first suspension shock by a factor of two.

6. The suspension system according to claim 1 wherein said at least one second suspension shock couples with said at least one rotational joint and connects to a bottom tube of such frame of the bicycle.

7. A suspension system, relating to absorbing shock transmitted to a seat of a bicycle, comprising:
 a) at least one seat suspension comprising
  i) seat post engager means for engaging at least one seat post of the seat of the bicycle,
  ii) frame mount means for mounting said at least one seat suspension to a frame of the bicycle,
  iii) suspension coupler means for coupling said seat post engager means and said frame mount means,
  iv) rotator means for permitting rotation of said suspension coupler means,
  v) first suspension cushion means for directly cushioning rotation of said suspension coupler means,
  vi) second suspension cushion means for indirectly cushioning rotation of said suspension coupler means;
 b) wherein said frame mount means mounts said rotator means to such frame of the bicycle;
 c) wherein the shock transmitted from such frame of the bicycle to the seat is cushioned by said at least one seat suspension; and
 d) wherein said first suspension cushion means connects to said suspension coupler means and a top tube of such frame of the bicycle.

8. The suspension system according to claim 7 further comprising motion multiplier means for multiplying the motion applied to said second suspension cushion means in relation to the motion applied to said first suspension cushion means.

9. The suspension system according to claim 8 wherein said second suspension cushion means couples with said rotator means and connects to a bottom tube of such frame of the bicycle.

10. The suspension system according to claim 9 wherein said second suspension cushion means connects to said motion multiplier means.

11. The suspension system according to claim 8 wherein said motion multiplier means multiplies the motion applied to said second suspension cushion means in relation to the motion applied to said first suspension cushion means by a factor of two.

12. The suspension system according to claim 7 wherein said second suspension cushion means couples with said rotator means and connects to a bottom tube of such frame of the bicycle.

13. The suspension system according to claim 7 wherein said suspension coupler means comprises at least one suspension arm.

14. A suspension system, relating to absorbing shock transmitted to a seat of a bicycle, comprising:
 a) a seat suspension comprising
  i) a seat post mount,
  ii) a frame mount,
  iii) a suspension arm,
  iv) a top bracket,
  v) a first suspension shock,
  vi) a second suspension shock,
  vii) a multiplier arm;
 b) wherein said frame mount mounts said top bracket to such frame of the bicycle;
 c) wherein said suspension arm connects said top bracket to said seat post mount;
 d) wherein said first suspension shock connects between said suspension arm and a top tube of a frame of the bicycle;
 e) wherein said multiplier arm connects said top bracket and said second suspension shock;
 f) wherein said top bracket permits rotation of said suspension arm and said multiplier arm;
 g) wherein said rotation of said suspension arm and said multiplier arm correspond;
 h) wherein said second suspension shock connects between said multiplier arm and a bottom tube of the frame of the bicycle;
 i) wherein a force acting vertically on the seat of the bicycle rotates said suspension arm and said multiplier arm which transfers motion to said first suspension shock and said second suspension shock;
 j) wherein the seat is cushioned from the effects of the force.

15. The suspension system according to claim 14 wherein said multiplier arm multiplies the motion applied to said second suspension shock in relation to the motion applied to said first suspension shock by at least a factor of two.

16. The suspension system according to claim 15 wherein said multiplier arm multiplies the motion applied to said second suspension shock in relation to the motion applied to said first suspension shock by a factor of two.

* * * * *